US009623526B2

(12) United States Patent
Perez et al.

(10) Patent No.: US 9,623,526 B2
(45) Date of Patent: Apr. 18, 2017

(54) LATHE WORK PIECE SUPPORT TOOL

(71) Applicant: CARTER PRODUCTS COMPANY, INC., Grand Rapids, MI (US)

(72) Inventors: Leland T. Perez, Alto, MI (US); Jeffery S. Folkert, Hudsonville, MI (US)

(73) Assignee: CARTER PRODUCTS COMPANY, INC., Grand Rapids, MI (US)

( * ) Notice: Subject to any disclaimer, the term of this patent is extended or adjusted under 35 U.S.C. 154(b) by 631 days.

(21) Appl. No.: 14/056,553

(22) Filed: Oct. 17, 2013

(65) Prior Publication Data

US 2014/0109734 A1 Apr. 24, 2014

Related U.S. Application Data

(60) Provisional application No. 61/715,481, filed on Oct. 18, 2012.

(51) Int. Cl.
*B23Q 1/76* (2006.01)
*B23B 5/14* (2006.01)
*B23B 31/12* (2006.01)
*B23B 25/00* (2006.01)

(52) U.S. Cl.
CPC ............. *B23Q 1/76* (2013.01); *B23B 25/00* (2013.01); *B23Q 2210/006* (2013.01); *Y10T 82/2572* (2015.01); *Y10T 82/2593* (2015.01)

(58) Field of Classification Search
CPC ...... B23Q 1/76; B23Q 1/72; B23Q 2210/006; B23B 25/00; B23B 31/1269
USPC .......................................... 82/152, 162, 164
See application file for complete search history.

(56) References Cited

U.S. PATENT DOCUMENTS

| | | | | |
|---|---|---|---|---|
| 285,115 A * | 9/1883 | Conkey | ..................... | B23Q 1/76 142/50 |
| 297,967 A * | 5/1884 | Brown | ..................... | B23Q 1/76 82/164 |
| 301,185 A * | 7/1884 | Railey | ..................... | B23Q 1/76 142/50 |
| 346,324 A * | 7/1886 | Seibert | ..................... | B23Q 1/76 142/50 |
| 429,880 A * | 6/1890 | Bogert | ..................... | B23Q 1/76 384/257 |
| 467,341 A * | 1/1892 | Cole | ........................ | B23Q 1/76 82/164 |

(Continued)

OTHER PUBLICATIONS

"Clark Steady Rest" and "Clark Deep Hollowing System," The Spin Doctor—TSDr, LLC, www.theokspindoctor.com (undated).

*Primary Examiner* — Sara Addisu
(74) *Attorney, Agent, or Firm* — Price Heneveld LLP

(57) ABSTRACT

A work piece support rest is provided for turning a work piece on a rotating lathe having a lathe bed, headstock, and a headstock spindle, where the work piece is attached to the headstock spindle. The support rest includes an adjustable base releasably attached to the slotted way of the bed via a locking plate and a pair of laterally adjustable way spacers moveable within a laterally extending slot that engage each side of the slotted way. A multi-piece outer ring is releasably attached to the adjustable base. A plurality of roller slides are releasably and adjustably attached to the outer ring, such that each of the roller slides extends radially inwardly and has a roller disposed at an inward distal end thereof for supporting the work piece.

21 Claims, 12 Drawing Sheets

(56) References Cited

U.S. PATENT DOCUMENTS

| | | | | |
|---|---|---|---|---|
| 1,370,705 | A * | 3/1921 | Norton | B23Q 1/76 384/252 |
| 1,378,253 | A * | 5/1921 | McConnell | B23Q 1/76 82/164 |
| 1,419,786 | A * | 6/1922 | Waterer | B23Q 1/763 142/48 |
| 1,586,139 | A * | 5/1926 | Bivins | B23Q 1/76 269/156 |
| 2,146,244 | A * | 2/1939 | Babcock | B23Q 1/0063 82/164 |
| 2,390,888 | A * | 12/1945 | Liber | B23Q 1/76 82/148 |
| 3,225,631 | A * | 12/1965 | Otto | B23Q 1/76 269/258 |
| 3,256,754 | A * | 6/1966 | Rivierre | B23B 31/00 144/209.1 |
| 3,464,685 | A * | 9/1969 | Schreib | B23K 7/006 228/4.1 |
| 3,493,223 | A * | 2/1970 | Galbarini | B23C 3/30 269/152 |
| 3,621,740 | A * | 11/1971 | Thomas | B23Q 1/76 82/117 |
| 3,981,211 | A * | 9/1976 | Turner | B23B 23/00 82/148 |
| 4,041,612 | A * | 8/1977 | Skubic | B23B 31/102 279/114 |
| 4,063,577 | A * | 12/1977 | Tennant | B27C 7/06 142/49 |
| 4,177,701 | A * | 12/1979 | Schulz | B23Q 1/76 82/104 |
| 4,416,174 | A * | 11/1983 | Owsen | B23Q 1/76 451/408 |
| 4,504,047 | A * | 3/1985 | Jantzen | B23K 9/0284 269/287 |
| 4,631,995 | A * | 12/1986 | Vroenen | B23B 31/101 82/164 |
| 4,995,434 | A * | 2/1991 | Christiansen | B27C 7/04 142/48 |
| 5,201,501 | A * | 4/1993 | Fassler | B23Q 1/76 269/156 |
| 5,224,529 | A * | 7/1993 | Kenny | B27C 7/00 142/1 |
| 5,282,403 | A * | 2/1994 | Rouleau | B23B 31/1269 82/127 |
| 5,347,897 | A * | 9/1994 | Rouleau | B23B 31/1269 82/127 |
| 5,661,565 | A * | 8/1997 | Bornhorst, Jr. | B23B 31/1622 358/3.32 |
| 5,915,898 | A * | 6/1999 | Pfister | B23Q 1/0063 144/135.3 |
| 6,799,494 | B1 * | 10/2004 | Ricci | B23B 3/06 82/113 |
| 7,191,689 | B2 * | 3/2007 | Clark | B27C 7/06 142/49 |
| 8,584,557 | B2 * | 11/2013 | Hall | B23B 3/26 82/113 |
| 9,205,570 | B2 * | 12/2015 | Perez | B27C 7/06 |
| 2015/0122092 | A1 * | 5/2015 | Tsai | B23Q 1/76 82/170 |

* cited by examiner

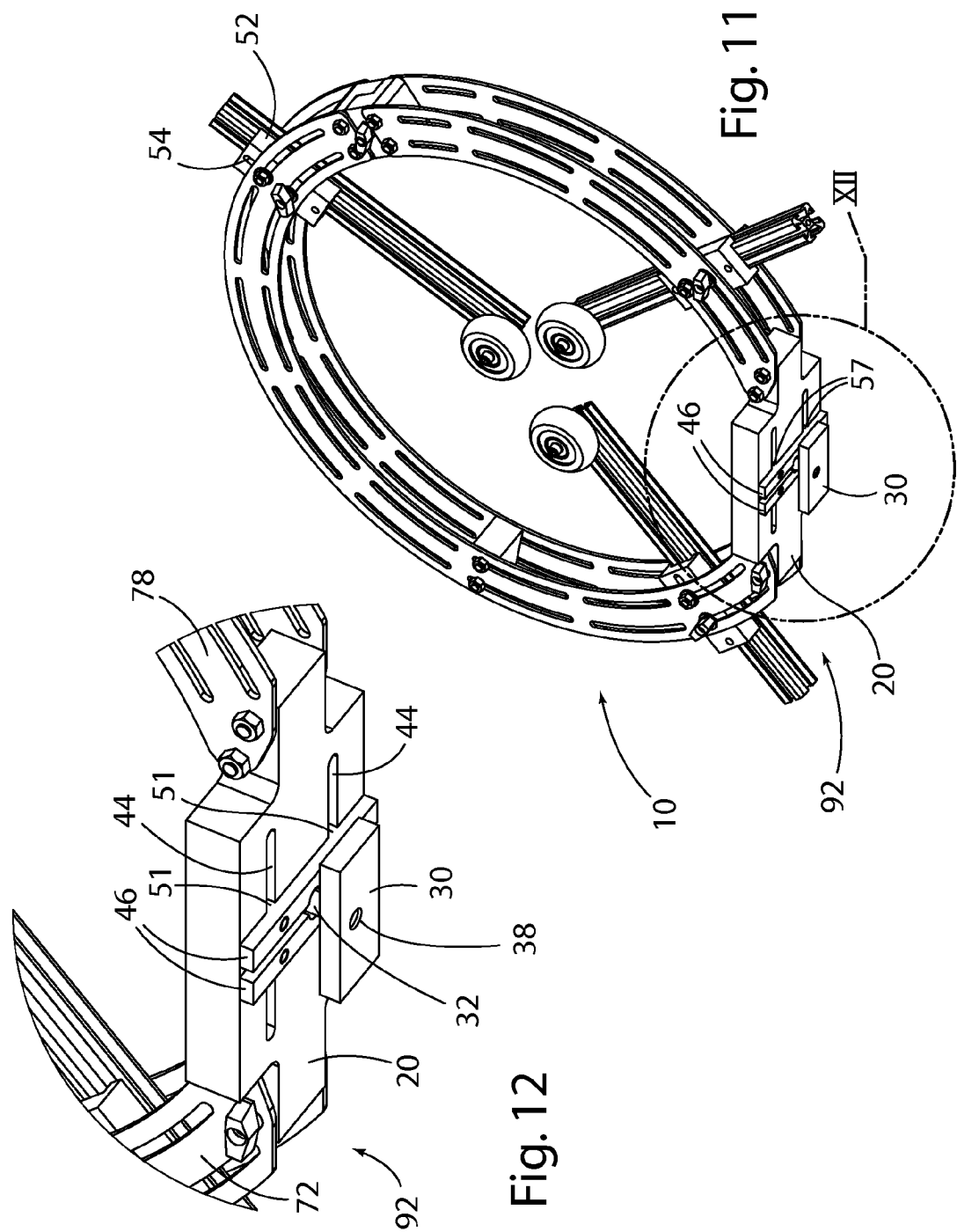

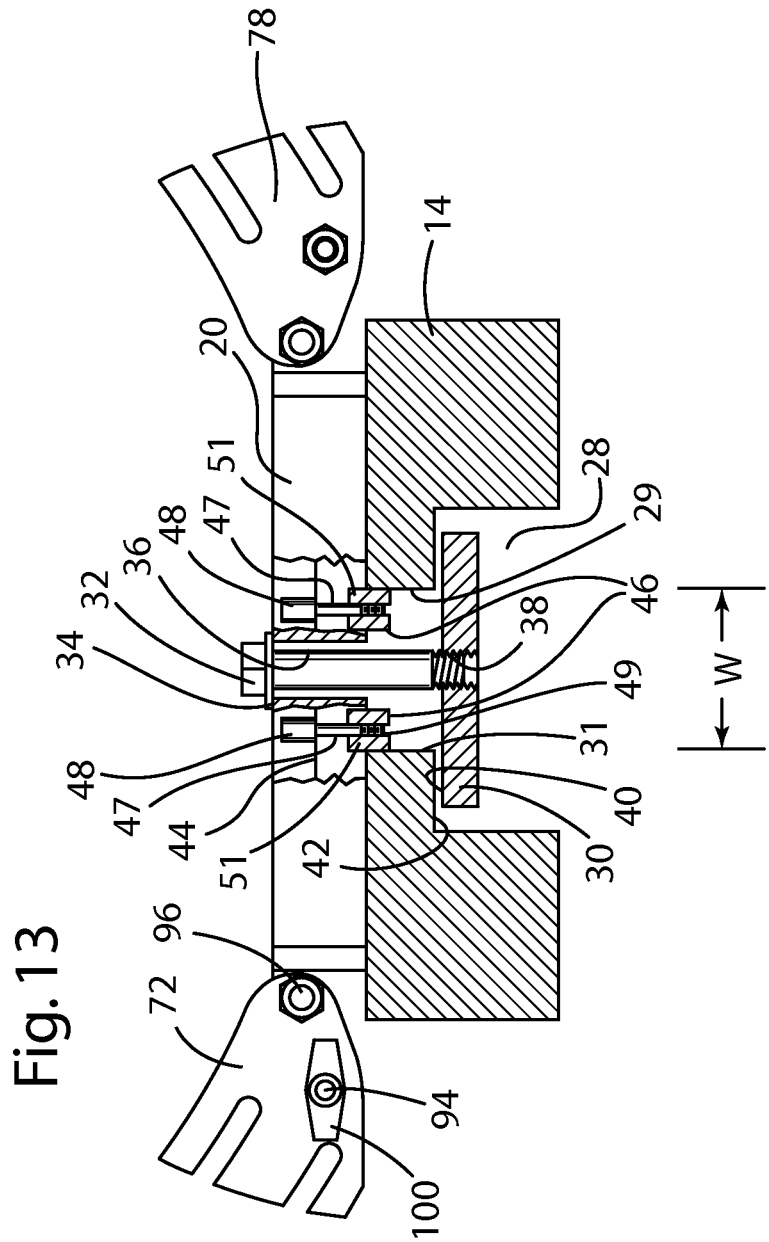

LATHE WORK PIECE SUPPORT TOOL

CROSS REFERENCE TO RELATED APPLICATION

The present application claims the benefit under 35 U.S.C. §119(e) of provisional Application No. 61/715,481, filed Oct. 18, 2012, entitled "LATHE WORK PIECE SUPPORT TOOL," the entire contents of which are incorporated herein by reference.

FIELD OF THE INVENTION

The present invention generally relates to a work piece support tool for lathes and, more particularly, to an adjustable and adaptable circular work piece support tool that is mountable to multiple lathe configurations.

BACKGROUND OF THE INVENTION

Turning lathes, particularly for wooden work pieces, have long been used for creating solid and hollowed forms, such as dowels, rungs, bowls, and vases. Generally, a wooden work piece is secured to a motorized lathe and a handheld cutting tool is used to cut away wood from outside and/or inside the work piece to form the outer and/or inner walls of the shaped form. It is common for a work piece support rest to be placed under or about the wooden work piece, where the handheld tool is advanced into the work piece to create the form.

A drawback of such work piece support rests, however, is that they are unique to a particular lathe configuration, thus requiring at least a unique mounting system for each lathe configuration, which adds complexity and cost. Such work piece support rests further often employ support structures that are fixed in place and lack flexibility. Finally, such work piece support rests are often difficult to remove when not in use, and require that the operator work around a relatively large structure that presents an obstacle in such circumstances.

Hence, a solution for improving the work piece support rest designs, while preserving their benefits, at minimal cost which overcomes these drawbacks, would be advantageous.

SUMMARY OF THE INVENTION

The work piece support rest of the present invention particularly overcomes the foregoing drawbacks of prior work piece support rests by providing a work piece support rest for turning a work piece on a rotating lathe having a lathe bed, headstock, headstock spindle, where the work piece is attached to the headstock spindle.

Another aspect of the present invention is a work piece support rest for turning a work piece on a rotating lathe comprising a lathe bed having a slotted way of a predetermined width having a pair of opposed sides and a length, a headstock, and a headstock spindle, wherein the work piece is attached to the headstock spindle and wherein the support rest comprises an adjustable base releasably attached to the lathe bed, the adjustable base having a locking plate received in the slotted way releasably restrained by a locking plate bolt so as to facilitate attachment of the adjustable base along the length of the slotted way; a laterally extending slot having a predetermined length extending through the adjustable base, the length of the slot extending across the width of the slotted way; and a pair of laterally adjustable way spacers releasably attached to the base through the laterally extending slot to adjust the lateral position of the way spacers within the slotted way of the lathe bed to engage either side of the width of the slotted way in the lathe bed.

A further aspect of the present invention is a work piece support comprising a parallel pair of laterally extending slots.

An additional aspect of the present invention is a work piece support wherein the laterally extending slot is countersunk.

A still further aspect of the present invention is a work piece support wherein the way spacers have an upwardly extending tab extending partially into the laterally extending slot.

Yet another aspect of the present invention is a work piece support rest having an outer ring releasably attached to the adjustable base, and a plurality of roller slides releasably and adjustably attached to the outer ring, each of the roller slides extending radially inwardly and having a roller disposed at an inward distal end thereof for supporting the work piece.

A further aspect of the present invention comprises at least one roller slide having an angle that is adjustable relative to a center axis of the work piece.

An additional aspect of the present invention is a work piece support rest, wherein the outer ring has a pair of radially offset matching curvilinear slots, at least one of the roller slides has a roller slide bracket provided with a longitudinal slot and an opening aligned with the curvilinear slots in the ring, and a pair of threaded fasteners extending through the curvilinear slots in the ring, wherein each of the pair of threaded fasteners is received in one of either the bracket longitudinal slot or opening.

A still further aspect of the present invention is a work piece support rest, wherein the roller slide is an extruded aluminum rod provided with a T-slot along a longitudinal length of the rod, wherein each of the pair of threaded fasteners is attached to corresponding slide nuts slidably disposed in the T-slot.

A further aspect of the present invention is a work piece support rest, wherein the outer ring has a plurality of pairs of symmetrical curvilinear slots disposed about the circumference of the outer ring.

Still another aspect of the present invention is a work piece support rest, wherein the outer ring is comprised of a first curved piece and a second curved piece, each of the first and second pieces being detachable one from the other.

Another aspect of the present invention is a work piece support rest, wherein the first curved piece comprises a larger portion of the circumference of the outer ring than the second curved piece.

An additional aspect of the present invention is a work piece support rest, wherein the first curved piece has a first end releasably attached to a first end of the second curved piece and a second end releasably attached to the base.

Yet another aspect of the present invention is a work piece support rest, wherein the first and second curved pieces are attached one to the other by a coupling comprising interlocking latch keys attached to each of the first end of the first curved piece and the first end of the second curved piece, a latch fastener extending through an aligned opening in each of the latch keys and a latch wing knob securing the latch fastener to the latch keys.

A further aspect of the present invention is a work piece support rest, wherein the first curved piece swings open from the latch about a hinge assembly.

A still further aspect of the present invention is a work piece support rest, wherein the hinge assembly comprises a hinge pin at a second end of the first curved piece and a notch in the base for receiving the hinge pin.

Still another aspect of the present invention is a work piece support rest, wherein a base fastener and wing knob are disposed proximate the hinge pin to fix the second end of the first curved piece to the base.

A yet additional aspect of the present invention is a work piece support rest, wherein the outer ring comprises a pair of curved symmetrical arcs in attached parallel relation one to the other and separated to form a central gap therebetween.

Another aspect of the present invention is a work piece support rest, wherein each of the roller slides extends through the central gap.

Still another aspect of the present invention is a work piece support rest, wherein the curved symmetrical arcs are separated by one or more spacers.

An additional aspect of the present invention is a work piece support rest, wherein the roller slides are mounted to the outer ring via roller slide brackets having a longitudinal slot and an opening aligned with the curvilinear slots in the ring, and a pair of threaded fasteners extending through the curvilinear slots in the ring, wherein each of the pair of threaded fasteners is received in one of either the bracket longitudinal slot or opening.

A still further aspect of the present invention is a work piece support rest for turning a work piece on a rotating lathe having a lathe bed, headstock, and headstock spindle, where the work piece is attached to the headstock spindle, the support rest comprising an adjustable base releasably attached to the lathe bed, wherein the base has laterally extending slots extending therethrough and way spacers attached to the base through the laterally extending slots to adjust the lateral position of the way spacers within the lathe bed to match the width of the slotted way in the lathe bed. The outer ring releasably attached to the adjustable base, and a plurality of roller slides releasably and adjustably attached to the outer ring, each of the roller slides extending radially inwardly and having a roller disposed at an inward distal end thereof for supporting the work piece.

A further aspect of the present invention is a method of supporting a work piece on a rotating lathe comprising a lathe bed having a slotted way of a predetermined width having a pair of opposed sides and a length, a headstock, and a headstock spindle, wherein the work piece is attached to the headstock spindle, the method comprising the steps of releasably attaching an adjustable base to the lathe bed, the adjustable base having a locking plate received in the slotted way releasably restrained by a locking plate bolt so as to facilitate attachment of the adjustable base along the length of the slotted way, providing a laterally extending slot having a predetermined length extending through the adjustable base, the length of the slot extending perpendicularly to the length of the slotted way, and releasably attaching a pair of laterally adjustable way spacers to the base through the laterally extending slot to adjust the lateral position of the way spacers within the slotted way of the lathe bed to engage either side of the width of the slotted way in the lathe bed.

An additional aspect of the present invention is a method of supporting a work piece on a rotating lathe having a lathe bed, headstock, and a headstock spindle, where the work piece is attached to the headstock spindle, the method comprising the further steps of releasably attaching an outer ring to the adjustable base, and releasably and adjustably attaching a plurality of roller slides to the outer ring, each of the roller slides extending radially inwardly and having a roller disposed at an inward distal end thereof for supporting the work piece.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 11 is a bottom side perspective plan view of the work piece support rest for turning a work piece in accordance with the present invention;

FIG. 12 is an enlarged bottom side perspective view of the base of the work piece support rest for turning a work piece in accordance with the present invention; and FIG. 13 is a front partial cross-sectional view of the base of the work piece support rest for turning a work piece in accordance with the present invention.

DETAILED DESCRIPTION OF THE PREFERRED EMBODIMENTS

Figure 1:
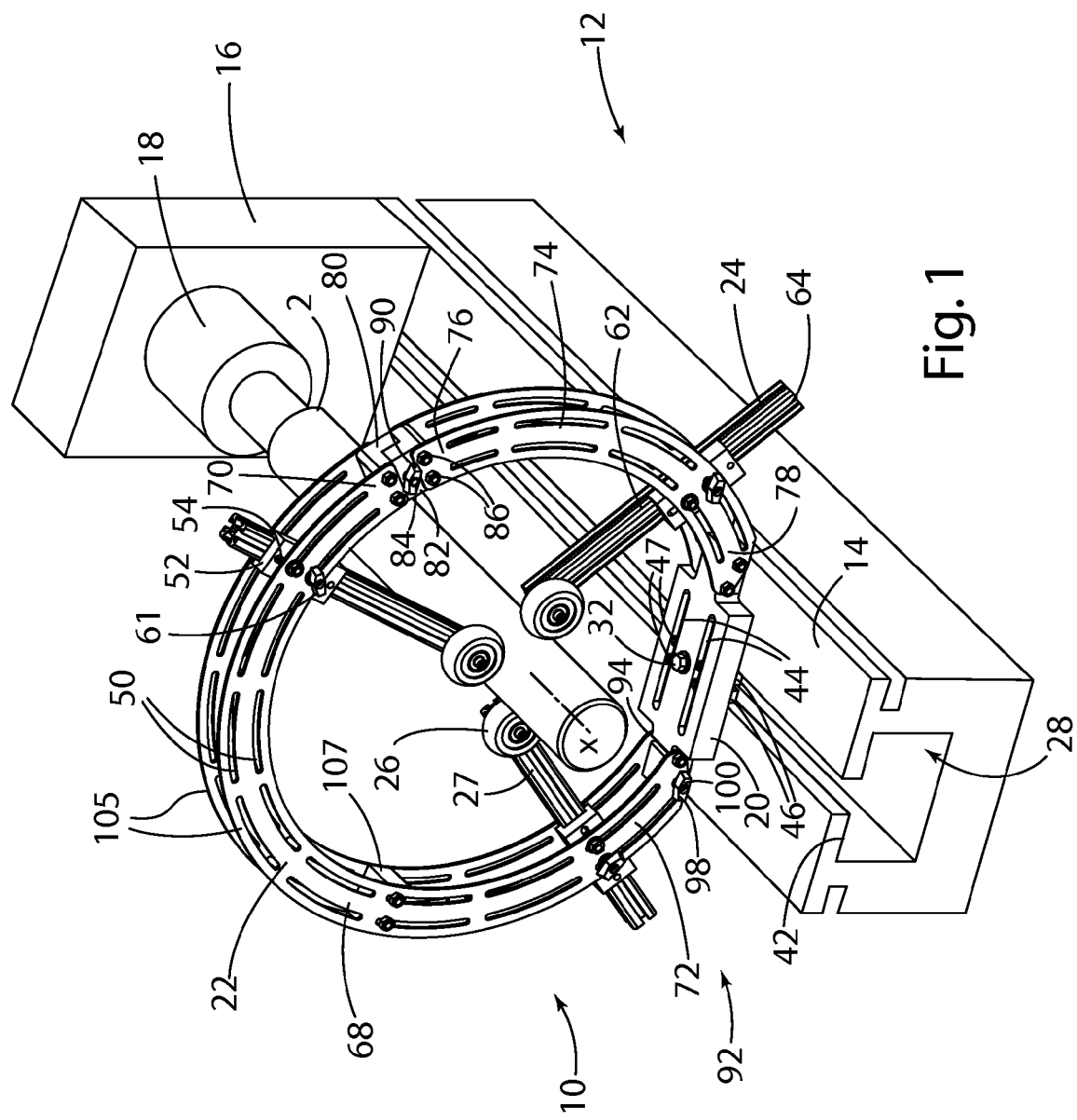
FIG. 1 is a front side perspective view of a work piece support rest for turning a work piece mounted on a lathe, in accordance with the present invention.
Figure 2:
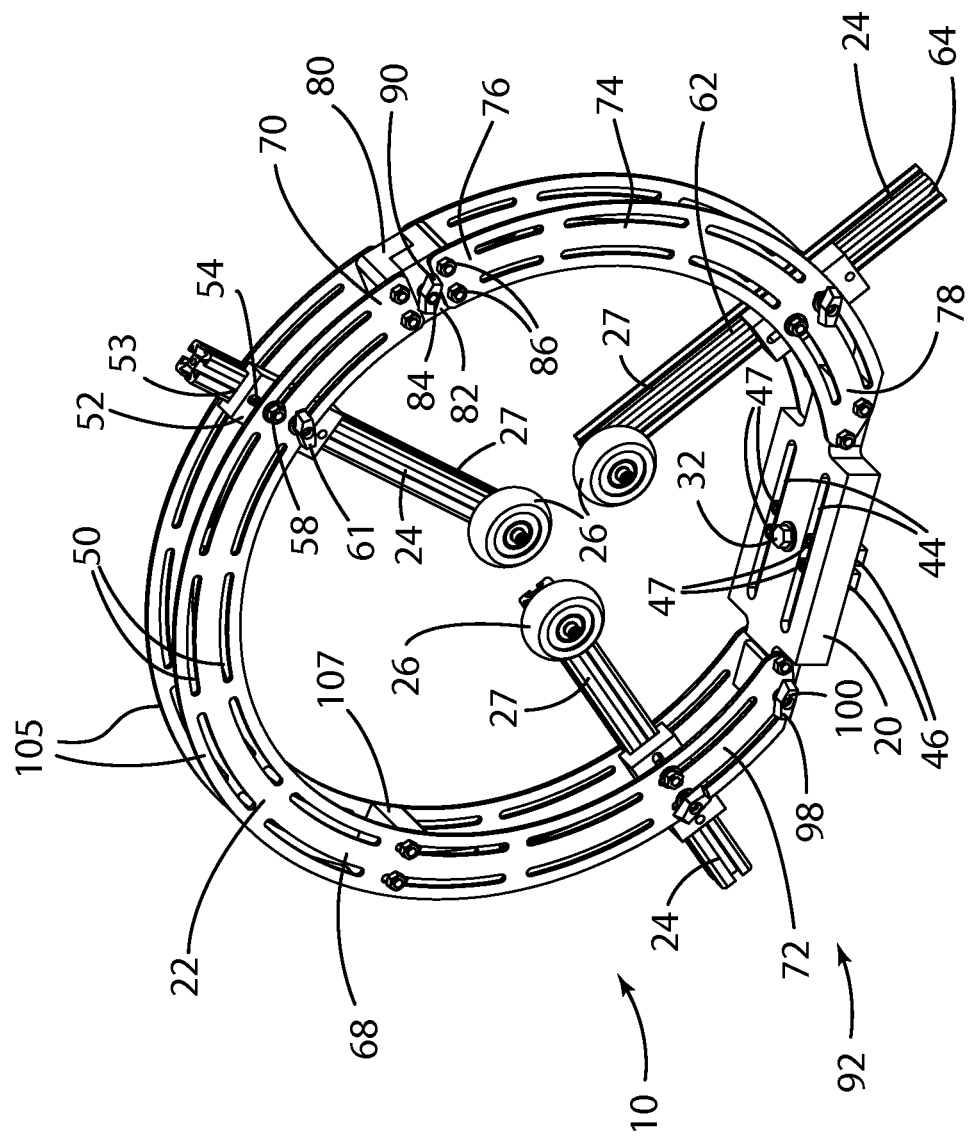
FIG. 2 is a front side perspective view of the work piece support rest for turning a work piece in accordance with the present invention.
Figure 3:
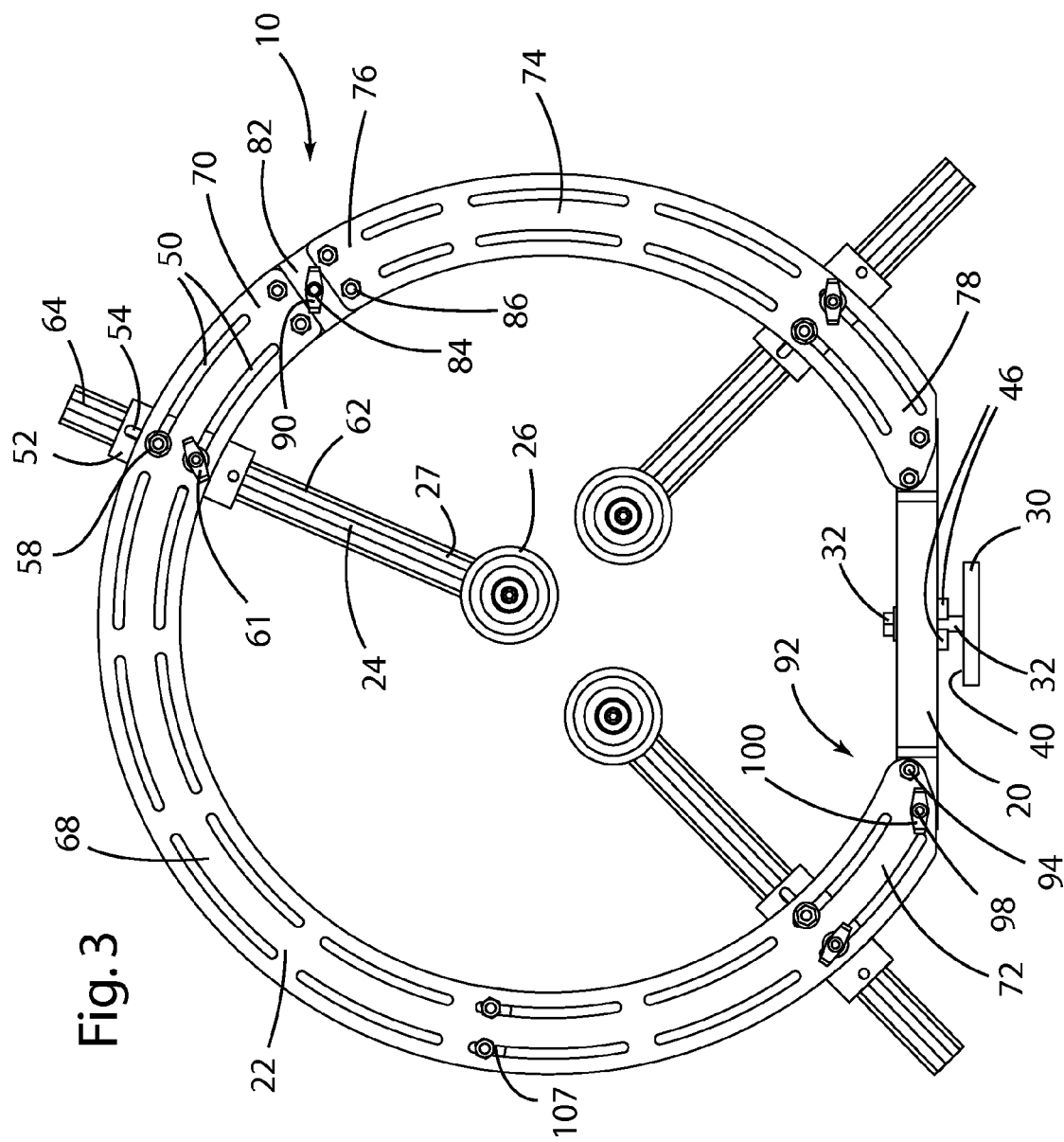
FIG. 3 is a front plan view of the work piece support rest for turning a work piece in accordance with the present invention.
Figure 4:
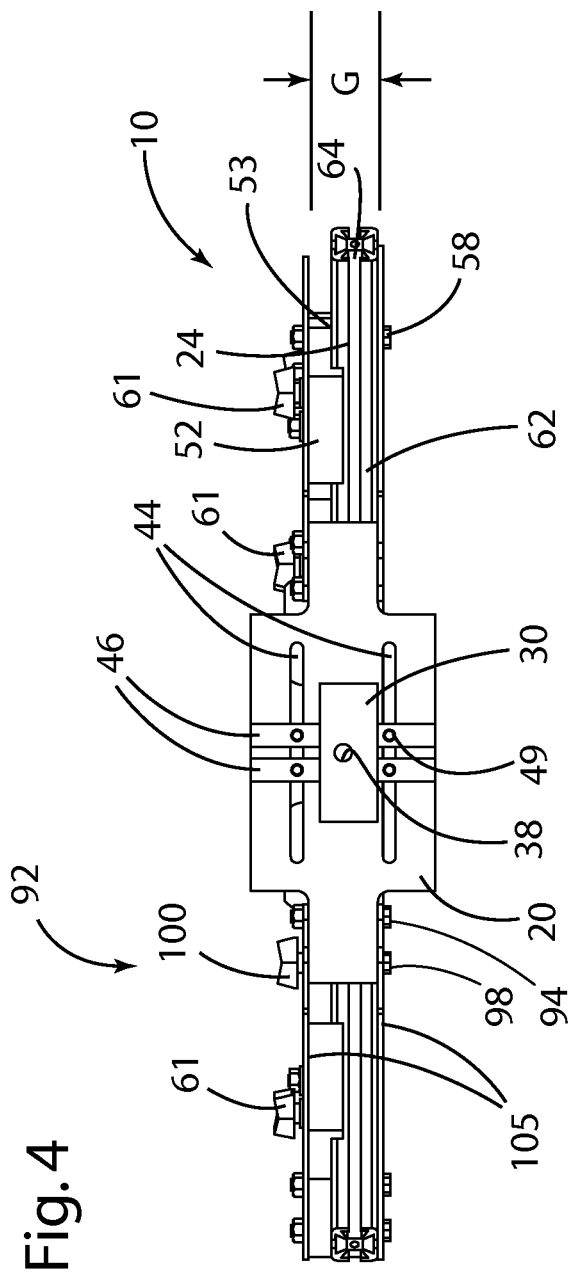
FIG. 4 is a bottom plan view of the work piece support rest for turning a work piece in accordance with the present invention.
Figure 5:
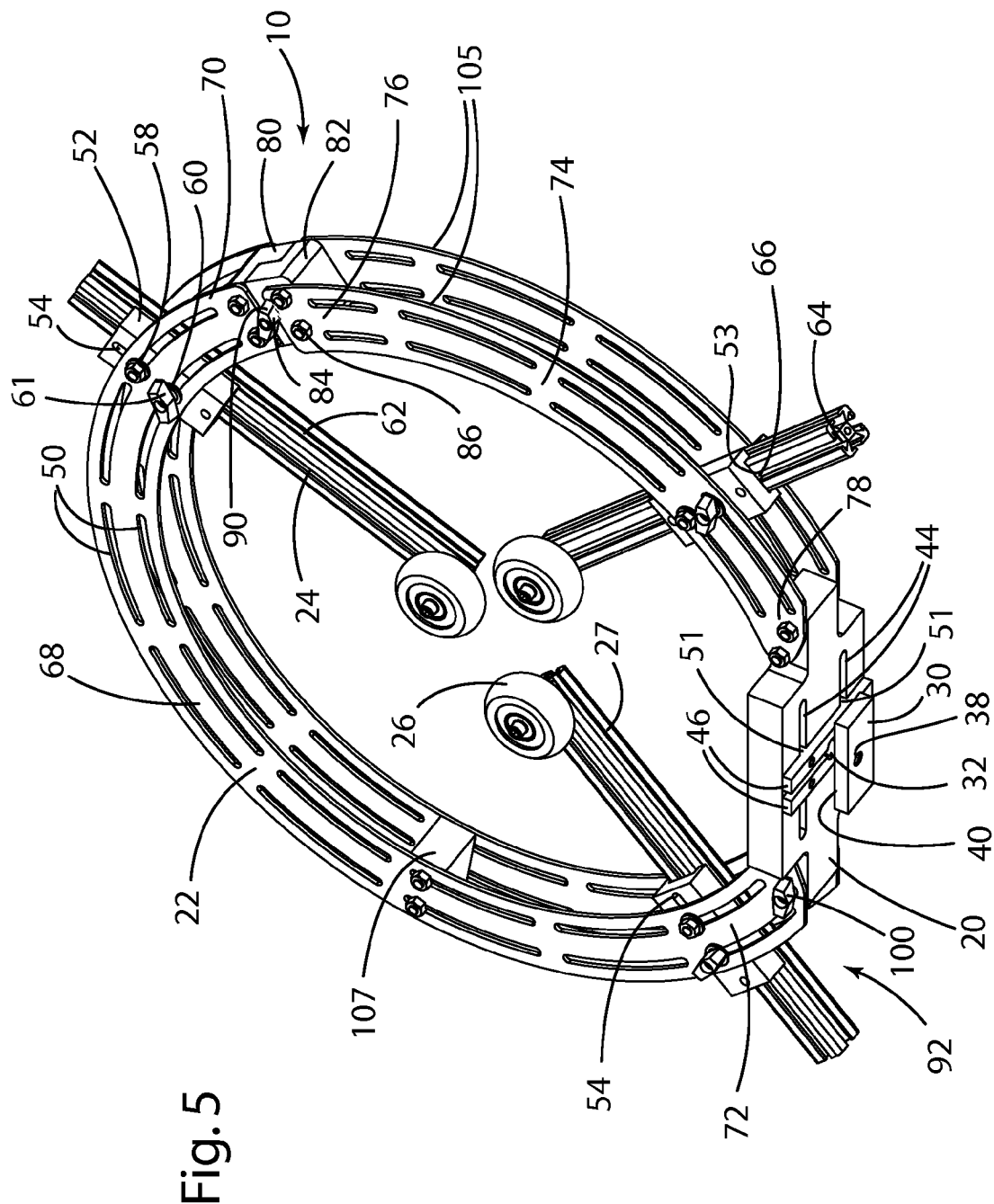
FIG. 5 is a bottom side perspective view of the work piece support rest for turning a work piece in accordance with the present invention.

For purposes of description herein, the terms "upper," "lower," "right," "left," "rear," "front," "vertical," "horizontal," and derivatives thereof shall relate to the invention as oriented in FIGS. 1-13. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in the Figures, the present invention relates to a work piece support rest 10 for turning a work piece 2 on a rotating lathe 12 having a lathe bed 14, headstock 16, and headstock spindle 18. As is known, the work piece 2 is attached to the headstock spindle 18 and is rotated along an axis X, and is preferably shaped with a hand-held or hand-operated cutting tool. As shown and described herein, the work piece 2 is preferably wood or some other similar formable material and the lathe 12 is adapted to such materials. However, it should be noted that the invention herein can also be advantageously employed with lathes designed for other materials, including metals such as steel and aluminum.

The support rest 10 preferably includes an adjustable base 20 that may be attached to the lathe bed 14 in such a manner so that the adjustable base 20 may be readily released and detached from the lathe bed 14 and subsequently reattached to another lathe 12, as further described below. The support rest 10 also includes an outer ring 22 attached to the adjustable base 20. Preferably, the outer ring 22 is also attached to the adjustable base 20 such that the outer ring 22 may be readily released and detached from the adjustable base 20, as also further described below. A plurality of roller slides 24 are, in turn, adjustably attached to the outer ring 22, again in such a manner so that the roller slides 24 may be readily released and detached from the outer ring 22 or adjusted relative the outer ring 22 as described herein. As shown in the Figures, preferably three roller slides 24 extend radially inwardly of the outer ring 22. However, additional roller slides may be used if desired. Each of the roller slides 24 is provided with a roller 26 disposed at an inward distal end 27 thereof for supporting the work piece 2, as shown in FIG. 1. Each of the rollers 26 are preferably bearing-mounted, non-marring urethane wheels having a rigid internal ring to prevent sidewall flex, thus giving adequate support without marring the work piece 2.

As shown in the Figures and as is known, the lathe bed 14 has a slotted way 28 that includes a lower surface 42. The adjustable base 20 is provided with a locking plate 30 received in the slotted way 28. The locking plate 30 has an upper surface 40 that is brought into releasable and abutting relation with the lower surface 42 of the slotted way 28 by the urging of a locking plate bolt 32 and washer 34, where the locking plate bolt 32 extends through an orifice 36 in the adjustable base 20. The orifice 36 has an inner diameter smaller than the outer diameter of the washer 34. The locking plate bolt 32 is preferably threadingly received in a tapped orifice 38 in locking plate 30. The adjustable base 20 can be readily and easily moved to any longitudinal position along the predetermined length of the lathe bed 14 by loosening the locking plate bolt 32 and sliding the adjustable base 20 within the slotted way 28 to the desired position and then retightened. Alternatively, the adjustable base 20 may be removed entirely from the lathe 12 by completely unthreading the locking bolt 32 from the locking plate 30 to allow the adjustable base 20 to be removed.

As shown, the adjustable base 20 is provided with a pair of parallel laterally extending slots 44 extending entirely through the adjustable base 20. The laterally extending slots 44 each have a length that extends across the width W of the slotted way 28. Preferably, the slots 44 extend perpendicular to the length of the slotted way 28. A pair of way spacers 46 is thus attached to and just beneath the adjustable base 20 through the laterally extending slots 44 to adjust the lateral position of the way spacers 46 within the slotted way 28 of the lathe bed 14 to exactly match the width W of the slotted way 28. To this end, way spacer bolts 47 are threadingly received within tapped orifices 49 in each of the way spacers 46 and extend through the laterally extending slots 44, such that tightening and loosening the way spacer bolts 47 allows lateral positioning of the way spacers 46 such that the same can be brought into secure engagement with each of the opposed sides 29, 31 of the slotted way 28 to stabilize the adjustable base 20 as the locking bolt 32 is tightened.

Figure 10:
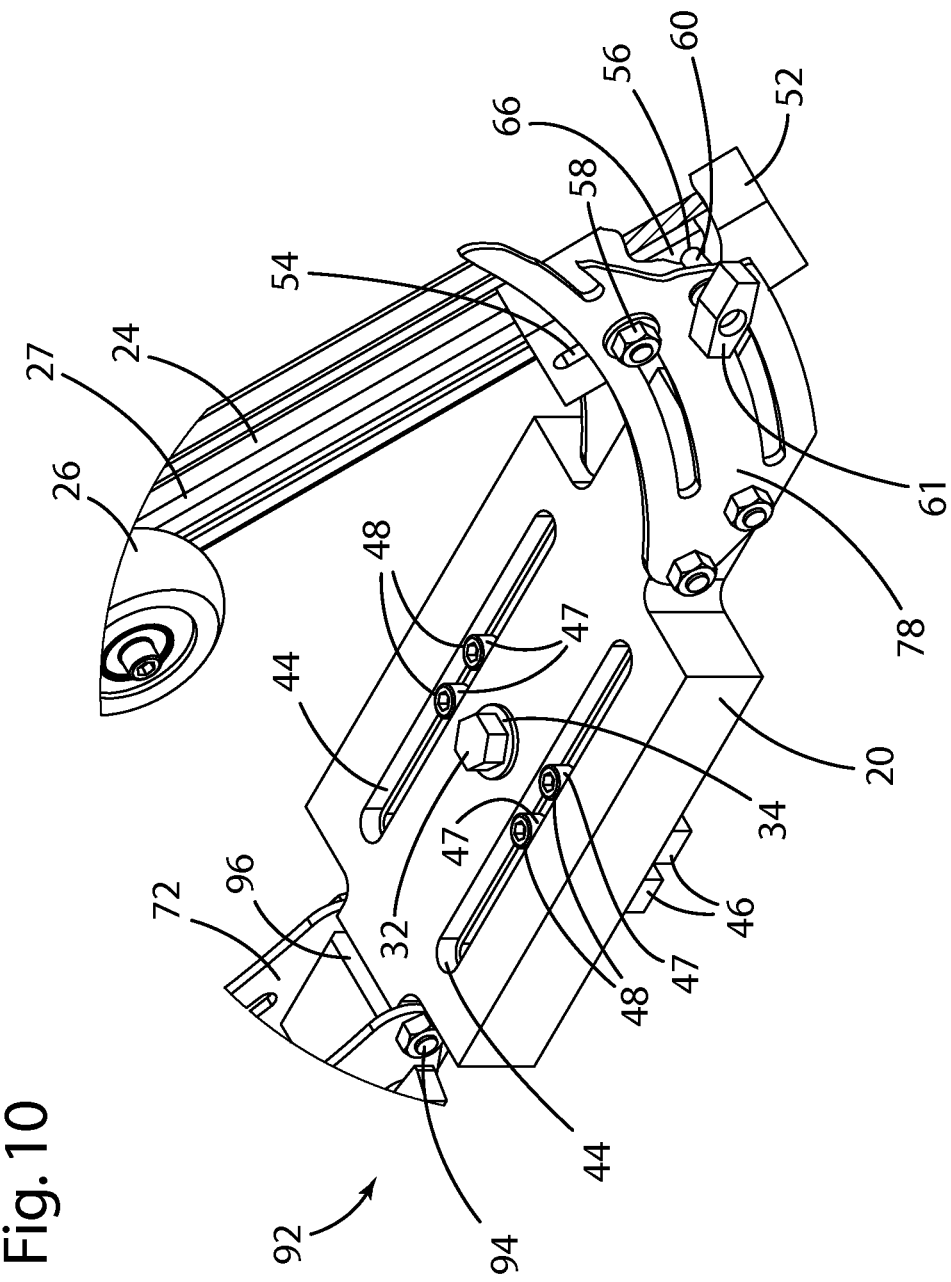
FIG. 10 is a front side perspective view of the interface of the base and the second curved piece of the work piece support rest for turning a work piece in accordance with the present invention.

Thus, a particularly advantageous feature of the present disclosure is that a single base 20 of the support rest 10 has independently adjustable way spacers 46 that preferably provide a secure fit on the lathe bed 14 having a slotted way 28 varying in sizes from 1 inch to 4.5 inches in width. Preferably, the laterally extending slots 44 are countersunk, as best shown in FIG. 10. However, the laterally extending slots 44 can be straight-walled, so long as the head 48 of the way spacer bolt 47 is larger than the width of the laterally extending slots 44. Further, preferably the way spacers 46 each have an upwardly extending tab 51 that partially extends into the laterally extending slots 44 to further stabilize the way spacers 46 once the way spacer bolt is tightened.

A further advantage of the present disclosure is that the position of the rollers 26 at the distal end 27 of the roller slides 24 is infinitely adjustable within the support rest 10. In particular, the angle and length of the roller slide 24 can be adjusted relative to a center axis X of the work piece 2 to maintain the centerline of the work piece X in alignment with the headstock spindle regardless of the brand, manufacturer and configuration of the lathe 12. In effect, each roller 26 can be positioned anywhere around and within the outer ring 22 to adjust the center position of the work piece 2 for a wide range of lathe 12 sizes and part diameters.

The foregoing angular and length-wise adjustability is obtained through a pair of radially offset matching curvilinear slots 50 extending through the outer ring 22, as shown in the Figures. Preferably, each, but at least one, of the roller slides 24 has a roller slide bracket 52 provided with a longitudinal slot 54 and an orifice 56 aligned with one each of the pair of curvilinear slots 50 in the ring, respectively, extending through the roller slide bracket 52. A bolt 58 extends through one of the pair of slots 50 and the longitudinal slot 54 in the roller slide bracket 52 and a bolt 60 extends through the other of the pair of slots 50 and the orifice 56 in the roller slide bracket 52. The roller slide 54 is preferably a square-shaped extruded aluminum rod 62 provided with a T-slot 64 that extends along at least one, but preferably each, side of the longitudinal length of the rod 62. As best shown in FIG. 10, each of the bolts 58 and 60 is threadingly received within corresponding slide nuts 66 that are slidably disposed within the T-slot 64. Preferably, bolt 60 is provided with a wing knob 61 for ready operation of the bolt 60 without the need for tools. The roller slide bracket 52 preferably has a longitudinal recess 53 within which the roller slide rod 62 is received and may slide.

In operation, when it is desired to change the position of the roller 26 within the outer ring 22, the wing knob 61 and the bolt 60 are loosened by hand. With bolt 58 already loosely tightened within its one of the pair of slots 50 and the longitudinal slot 54, and held in place within T-slot 64 by slide nut 66, the roller slide 24 can be rotated relative the outer ring 22, with the distance between the bolts 58 and 60 becoming closer and further apart depending on whether the roller slide is perpendicular to the tangent of the outer ring 22 or at an angle thereto and at an angle relative to the center axis X of the work piece 2. Likewise, with both bolts 58, 60 loosened, the roller slide rod 62 can be pushed inwardly or pulled outwardly within the recess 53 of the roller slide bracket 52 to move the roller 26 radially within the outer ring 22. The roller slide can be readily secured in place by retightening bolt 60. As shown, the work piece support rest 10 preferably has a plurality of pairs of symmetrical curvilinear slots 50 disposed about the circumference of the outer ring 22 to accommodate positioning the roller slides 24 completely about the periphery.

Figure 6:
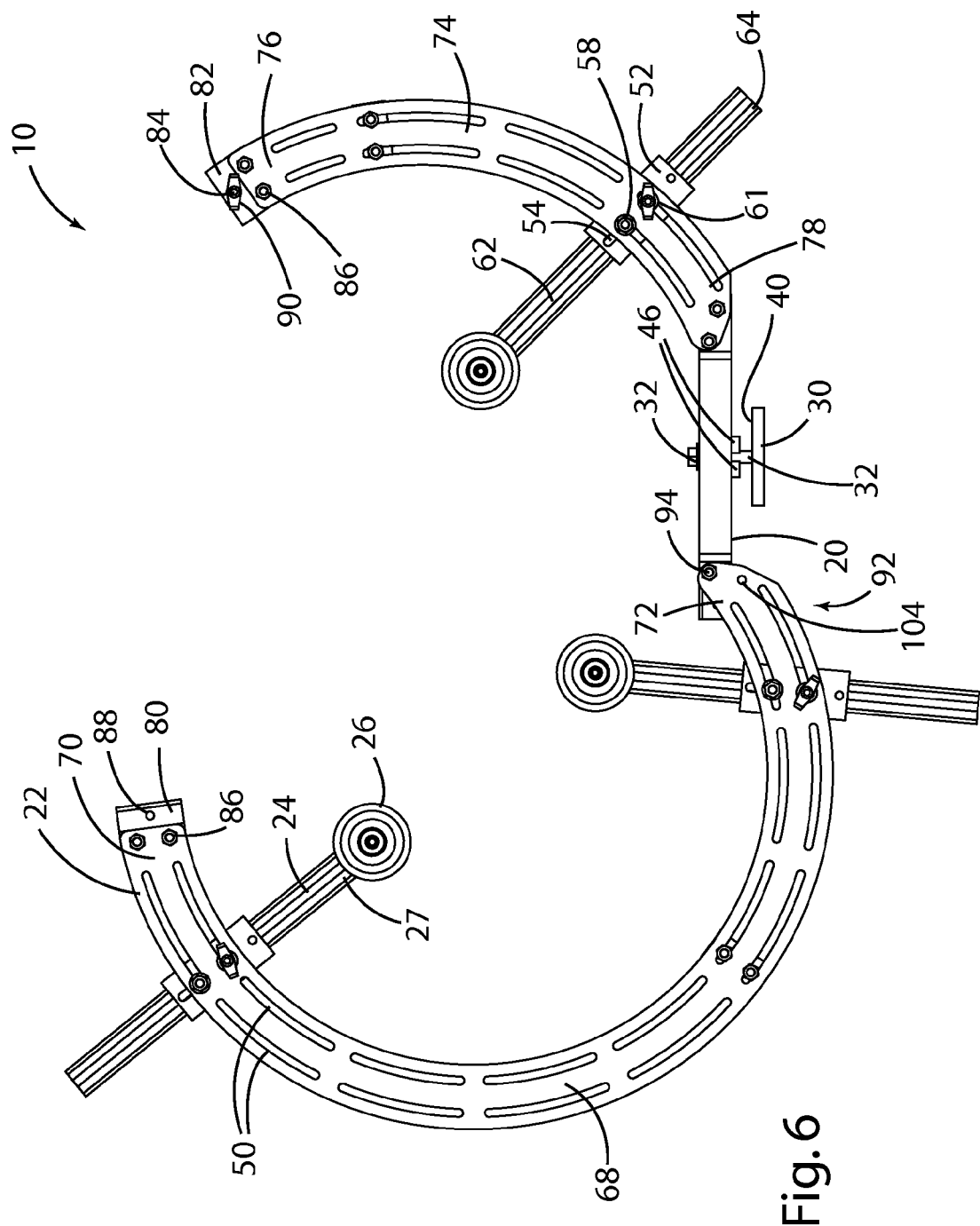
FIG. 6 is a front plan view of the work piece support rest for turning a work piece in accordance with the present invention in the open position.
Figure 7:
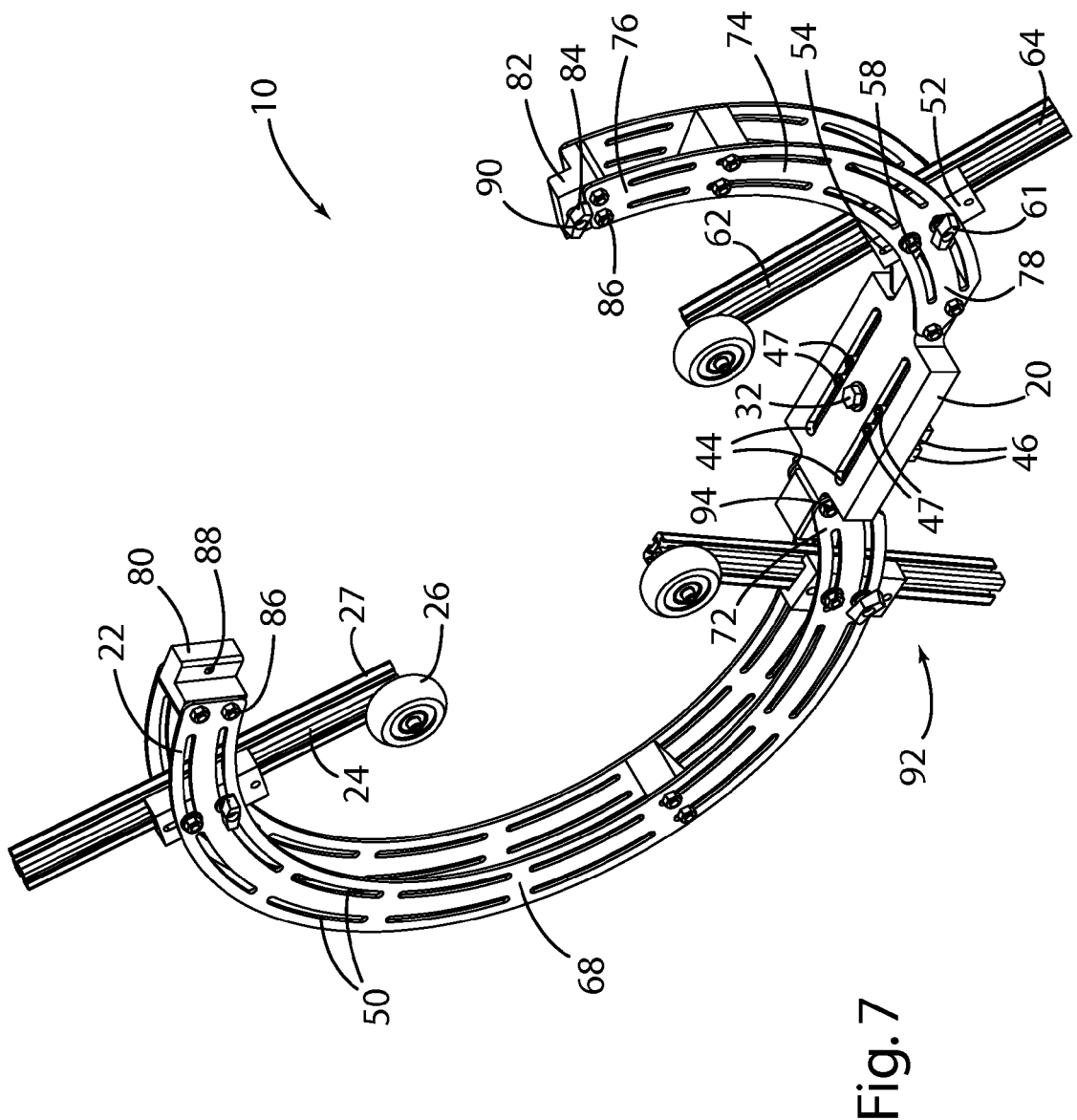
FIG. 7 is a front side perspective of the work piece support rest for turning a work piece in accordance with the present invention in the open position.

An additional feature of the work piece support rest 10 of the present disclosure is a two-piece design that allows the work piece support rest 10 of the present disclosure to be quickly opened, while leaving the mounting base 20 of the support rest 10 still firmly attached to the lathe bed 14, as shown in FIGS. 6 and 7. This feature provides easy access for mounting or demounting parts or for sanding, shaping, and other secondary operations. To accomplish this feature, the outer ring 22 comprises a first curved piece 68 having a first end 70 and a second end 72, and a second curved piece 74, also having a first end 76 and second end 78. Each of the first and second pieces 68, 74 is detachable one from the other. Preferably, the first curved piece 68 comprises a larger portion of the circumference of the outer ring 22 than the second curved piece 74. Even more preferably, the first curved piece 68 comprises at least twice the circumference of the outer ring 22 as the second curved piece 74.

The first end 70 of the first curved piece 68 is preferably releasably attached to the first end 76 of the second curved piece 74. The second end 72 of the first curved piece 68 is preferably releasably attached to the adjustable base 20. The second end 78 of the second curved piece is preferably secured to the adjustable base 20 as well, but need not be readily releasable. Preferably, the first and second curved pieces 68, 74 are attached one to the other by a coupling comprising interlocking latch keys 80, 82 attached to each of the first end 70 of the first curved piece 68 and the first end 76 of the second curved piece 74, respectively, through latch fasteners 86. A latch key fastener 84 extends through an aligned orifice 88 in each of the latch keys 80, 82 and a latch wing knob 90 secures the latch key fastener 84 to the latch keys 80, 82.

A hinge assembly 92 preferably couples the second end 72 of the first curved piece 68 to the adjustable base 20 to allow the first curved piece 68 to swing open from the latch keys 80, 82. The hinge assembly 92 comprises a hinge pin 94 extending though the second end 72 of the first curved piece 68 and a notch 96 extending along the width of the adjustable base 20 that receives the hinge pin 94. A base fastener 98 extending through an orifice 102 in the adjustable base 20 and orifice 104 in the second end 72 of the first curved piece 68 and corresponding wing knob 100 are disposed proximate the hinge pin 94 to fix or release the second end 72 of the first curved piece 70 to the adjustable base 20. Thus, by loosening the latch wing knob 90 and the base fastener knob 100 by hand, the latch key fastener 84 may be removed, the first and second curved pieces 68, 74 may be separated, and the first curved piece 68 can be swung out of the way or completely removed from the support rest 10.

Figure 8:
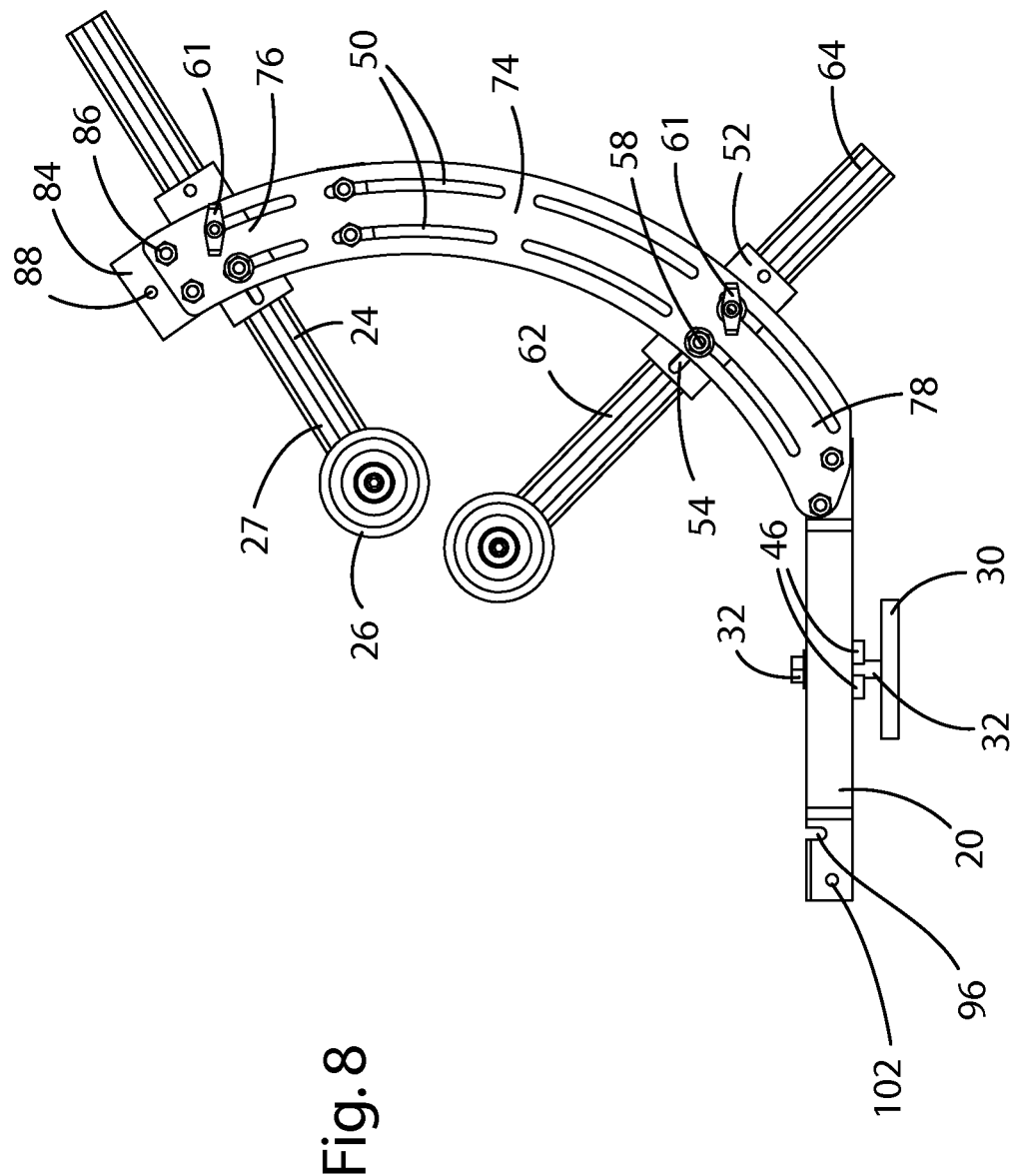
FIG. 8 is a front plan view of the base and a second curved piece of the work piece support rest for turning a work piece in accordance with the present invention in the open position.
Figure 9:
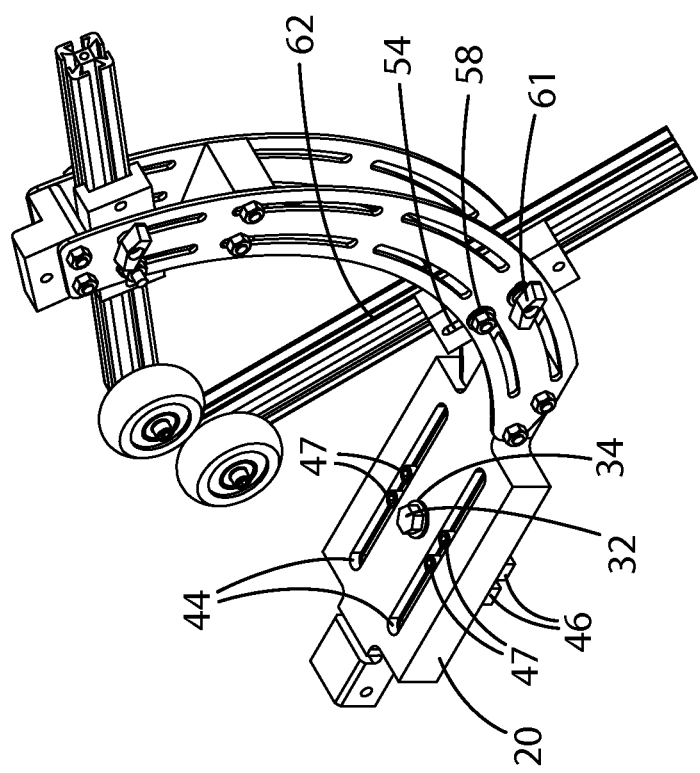
FIG. 9 is a front side perspective view of the base and the second curved piece of the work piece support rest for turning a work piece in accordance with the present invention in the open position.

Advantageously, when the first curved piece 68 is removed from the outer ring 22, as shown in FIGS. 8 and 9, the remaining second curved piece 74 can be used as a bowl rest, providing solid support behind the work piece 2, yet fully exposing the opposite side of the work piece 22 for exterior cutting operations.

The outer ring 22 is preferably fabricated from pairs of curved symmetrical arcs 105 in attached parallel relation one to the other and separated to form a central gap G therebetween. Preferably, the pairs of curved symmetrical arcs 105 are separated by at least one spacer 107 having a thickness equal to the thickness of the combination of the first and second latch keys 80, 82, where the spacer 107 and latch keys 80, 82 are located approximately 120 degrees from each other on oppose sides of the outer ring 22. Further, as each of the roller slides 24 extend through the gap G, the spacer 107 and the latch keys 80, 82 preferably also have a thickness equal to the thickness of the combination of the roller slide rod 62 and roller slide bracket 52 combination.

Preferably, the pairs of curved symmetrical arcs 105 are fabricated from high-strength, laser-cut steel. The adjustable base 20 is preferably fabricated from aircraft-grade aluminum components to assure strength and durability. The resulting multi-ring structure of the support rest 10 of the present disclosure thus presents great flexibility, and is compatible with swing sizes of the lathe 12 up to 20 inches with no additional hardware required, while also presenting great rigidity, keeping the weight of the support rest 10 to half that of a comparable steel rest.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A work piece support rest for turning a work piece on a rotating lathe comprising a lathe bed having a slotted way of a predetermined width having a pair of opposed sides and a length, a headstock, and a headstock spindle, wherein the work piece is attached to the headstock spindle and wherein the support rest comprises:
    an adjustable base releasably attached to the lathe bed and adjustable along the length of the slotted way;
    a locking plate received in the slotted way, the locking plate being releasably restrained by a locking plate bolt extending through the adjustable base so as to facilitate attachment of the adjustable base along the length of the slotted way;
    a laterally extending slot having a predetermined length extending through the adjustable base, the length of the laterally extending slot extending across the width of the slotted way; and
    a pair of laterally adjustable way spacers releasably attached to the adjustable base through the laterally extending slot to adjust the lateral position of the way spacers within the slotted way of the lathe bed to engage either side of the width of the slotted way in the lathe bed.

2. The work piece support rest of claim 1 further comprising a parallel pair of laterally extending slots.

3. The work piece support rest of claim 1, wherein the laterally extending slot is countersunk.

4. The work piece support rest of claim 1, wherein the way spacers have an upwardly extending tab extending partially into the laterally extending slot.

5. The work piece support rest of claim 1 further comprising an outer ring releasably attached to the adjustable base; and a plurality of roller slides releasably and adjustably attached to the outer ring, each of the plurality of roller slides extending radially inwardly and having a roller disposed at an inward distal end thereof for supporting the work piece.

6. The work piece support rest of claim 5, wherein at least one roller slide has an angle that is adjustable relative to a center axis of the work piece.

7. The work piece support rest of claim 5, wherein the outer ring has a pair of radially offset matching curvilinear slots, at least one of the roller slides having a roller slide bracket provided with a longitudinal slot and an opening aligned with the curvilinear slots in the ring, and a pair of threaded fasteners extending through the curvilinear slots in the ring, wherein each of the pair of threaded fasteners is received in one of either the bracket longitudinal slot or opening.

8. The work piece support rest of claim 7, wherein the roller slide is an extruded aluminum rod provided with a T-slot along a longitudinal length of the rod, wherein each of the pair of threaded fasteners is attached to corresponding slide nuts slidably disposed in the T-slot.

9. The work piece support rest of claim 7, wherein the outer ring has a plurality of pairs of symmetrical curvilinear slots disposed about the circumference of the outer ring.

10. The work piece support rest of claim 5, wherein the outer ring is comprised of a first curved piece and a second curved piece, each of the first and second pieces being detachable one from the other.

11. The work piece support rest of claim 10, wherein the first curved piece comprises a larger portion of the circumference of the outer ring than the second curved piece.

12. The work piece support rest of claim 10, wherein the first curved piece has a first end releasably attached to a first end of the second curved piece and a second end releasably attached to the base.

13. The work piece support rest of claim 10, wherein the first and second curved pieces are attached one to the other by a coupling comprising interlocking latch keys attached to each of the first end of the first curved piece and the first end of the second curved piece, a latch fastener extending through an aligned opening in each of the latch keys and a latch wing knob securing the latch fastener to the latch keys.

14. The work piece support rest of claim 10, wherein the first curved piece swings open from the latch about a hinge assembly.

15. The work piece support rest of claim 14, wherein the hinge assembly comprises a hinge pin at a second end of the first curved piece and a notch in the base for receiving the hinge pin.

16. The work piece support rest of claim 15, wherein a base fastener and wing knob are disposed proximate the hinge pin to fix the second end of the first curved piece to the base.

17. The work piece support rest of claim 5, wherein the outer ring comprises a pair of curved symmetrical arcs in attached parallel relation one to the other and separated to form a central gap therebetween.

18. The work piece support rest of claim 17, wherein each of the roller slides extends through the central gap.

19. The work piece support rest of claim 17, wherein the curved symmetrical arcs are separated by one or more spacers.

20. The work piece support rest of claim 17, wherein the roller slides are mounted to the outer ring via roller slide brackets having a longitudinal slot and an opening aligned with the curvilinear slots in the ring, and a pair of threaded fasteners extending through the curvilinear slots in the ring, wherein each of the pair of threaded fasteners is received in one of either the bracket longitudinal slot or opening.

21. A work piece support rest for turning a work piece on a rotating lathe having a lathe bed, headstock, and a headstock spindle, wherein the work piece is attached to the headstock spindle, the support rest comprising:
   an adjustable base releasably attached to the lathe bed and adjustable along a length of the lathe bed, wherein the base has laterally extending slots extending therethrough and way spacers adjustably attached to the base through the laterally extending slots to adjust the lateral position of the way spacers within the slotted way of the lathe bed to match the width of the slotted way in the lathe bed;
   an outer ring releasably attached to the adjustable base; and
   a plurality of roller slides releasably and adjustably attached to the outer ring, each of the roller slides extending radially inwardly and having a roller disposed at an inward distal end thereof for supporting the work piece.

* * * * *